United States Patent
Zimmer et al.

(10) Patent No.: US 12,128,520 B2
(45) Date of Patent: Oct. 29, 2024

(54) PRODUCTION CELL WITH WORKPIECE RETURN

(71) Applicants: Martin Zimmer, Rheinau (DE); Günther Zimmer, Rheinau (DE)

(72) Inventors: Martin Zimmer, Rheinau (DE); Günther Zimmer, Rheinau (DE)

(*) Notice: Subject to any disclaimer, the term of this patent is extended or adjusted under 35 U.S.C. 154(b) by 0 days.

(21) Appl. No.: 17/914,383

(22) PCT Filed: Mar. 23, 2021

(86) PCT No.: PCT/DE2021/000051
§ 371 (c)(1),
(2) Date: Jan. 9, 2023

(87) PCT Pub. No.: WO2021/190681
PCT Pub. Date: Sep. 30, 2021

(65) Prior Publication Data
US 2024/0261922 A1  Aug. 8, 2024

(30) Foreign Application Priority Data
Mar. 27, 2020 (DE) .................... 10 2020 001 963.3

(51) Int. Cl.
*B23Q 7/16* (2006.01)
*B23Q 7/14* (2006.01)
*B23Q 41/02* (2006.01)

(52) U.S. Cl.
CPC ........... *B23Q 7/165* (2013.01); *B23Q 7/1436* (2013.01); *B23Q 41/02* (2013.01)

(58) Field of Classification Search
CPC ...... B23Q 7/165; B23Q 41/02; B23Q 7/1431; B23Q 7/1442; B23Q 7/1457; B23Q 7/1468; B23Q 7/1489; B23Q 7/1436; B23Q 7/16; B21B 39/32; B23C 3/13; B65G 47/248
USPC ................................ 198/468.11, 468.2, 468.9
See application file for complete search history.

(56) References Cited

U.S. PATENT DOCUMENTS

2007/0284216 A1  12/2007  Meier et al.
2016/0236310 A1  8/2016  Riepling et al.

FOREIGN PATENT DOCUMENTS

| DE | 1003430 B | 2/1957 | |
| DE | 9307220 U1 * | 10/1993 | ............... B23Q 7/08 |
| DE | 102004016071 A1 | 10/2005 | |
| DE | 102014217157 A1 | 3/2016 | |

(Continued)

*Primary Examiner* — Gregory W Adams
(74) *Attorney, Agent, or Firm* — Smartpat PLC (57) ABSTRACT

A production cell includes a workpiece conveyor device which has at least one workpiece carriage. It further includes at least one workpiece processing device and a workpiece transfer station. A provided workpiece can be conveyed to the workpiece processing station and from the processing station to the workpiece transfer station by the workpiece carriage. The production cell has a workpiece tilting device which is arranged at the workpiece transfer station and a workpiece return device with a workpiece temporary storage device. A workpiece can be transferred to the workpiece return device by the workpiece tilting device at the workpiece transfer station, and the workpiece can be conveyed into the workpiece temporary storage device. The workpiece can be removed from the workpiece temporary storage device and can be provided to the workpiece conveyor device.

12 Claims, 6 Drawing Sheets

(56) References Cited

FOREIGN PATENT DOCUMENTS

| DE | 102014226333 | A1 | * | 6/2016 | ............... B23Q 7/00 |
| DE | 102017012077 | A1 | | 7/2018 | |
| DE | 102017004831 | A1 | | 11/2018 | |
| WO | 2005095048 | A1 | | 10/2005 | |
| WO | 2018121808 | A1 | | 7/2018 | |

* cited by examiner

PRODUCTION CELL WITH WORKPIECE RETURN

TECHNICAL FIELD

The disclosure relates to a production cell with a workpiece conveyor device that has at least one workpiece carriage, with at least one workpiece processing device and a work-piece transfer station, wherein a provided workpiece can be conveyed to the workpiece processing station and from there to the workpiece transfer station by the workpiece carriage, along with a method for processing a workpiece in such a production cell.

BACKGROUND

DE 10 2017 012 077 A1 discloses a production cell with which a workpiece can be processed.

The present disclosure is based on the problem of extending the possible fields of application of a production cell.

SUMMARY

This problem is solved with the features of the main claim. For this purpose, the production cell has a workpiece tilting device arranged at the workpiece transfer station and has a workpiece return device with a workpiece temporary storage device. At the workpiece transfer station, a workpiece can be transferred to the workpiece return device by means of the workpiece tilting device, and this workpiece can be conveyed into the workpiece temporary storage device. The workpiece can be removed from the workpiece temporary storage device and can be provided to the workpiece conveyor device.

During processing, the workpiece is processed on the workpiece upper side after it has been provided for the first time. After removal from the workpiece temporary storage device and a second supplying, the workpiece is processed on its workpiece lower side.

The production cell described enables double-sided processing of a plate-shaped workpiece, for example. The blank of the workpiece, which is initially removed from the magazine, is transferred to the workpiece conveyor device by means of the workpiece feeding device. The workpiece conveyor device conveys the workpiece to at least one processing station and from there to the workpiece transfer station. For this purpose, the workpiece conveyor device has workpiece carriages that pick up the workpiece by means of a workpiece clamping device. The workpiece carriages then move the workpiece in the conveying direction, either individually or controlled in groups.

In the workpiece transfer station, the at least partially processed workpiece can either be removed from the production cell or returned for further processing. For the latter operation, a workpiece tilting device is arranged at the workpiece transfer station. The workpiece tilting device tilts the workpiece such that its lower side can be gripped. The workpiece is taken over by the workpiece return device and conveyed to the workpiece temporary storage device. The workpiece feeding device grips the workpiece in the workpiece temporary storage device and transfers it to the workpiece conveyor device. Subsequently, the lower side of the workpiece can be processed at the aforementioned processing stations.

Further details of the invention will be apparent from the subclaims and the following description of schematically illustrated embodiments.

DETAILED DESCRIPTION

FIGS. 1-9 show a production cell (10). Production cells (10) of this type are used for partial processing or complete processing of workpieces (1; 2). The individual, unprocessed workpiece (1; 2) is removed from a magazine (11) and, after processing, deposited at a pick-up station (101) of a tool transfer station (100). In the exemplary embodiment, the pick-up station (101) is spatially separated from the magazine (11). However, it is also conceivable to arrange the pick-up station (101) next to the magazine (11).

Figure 1:
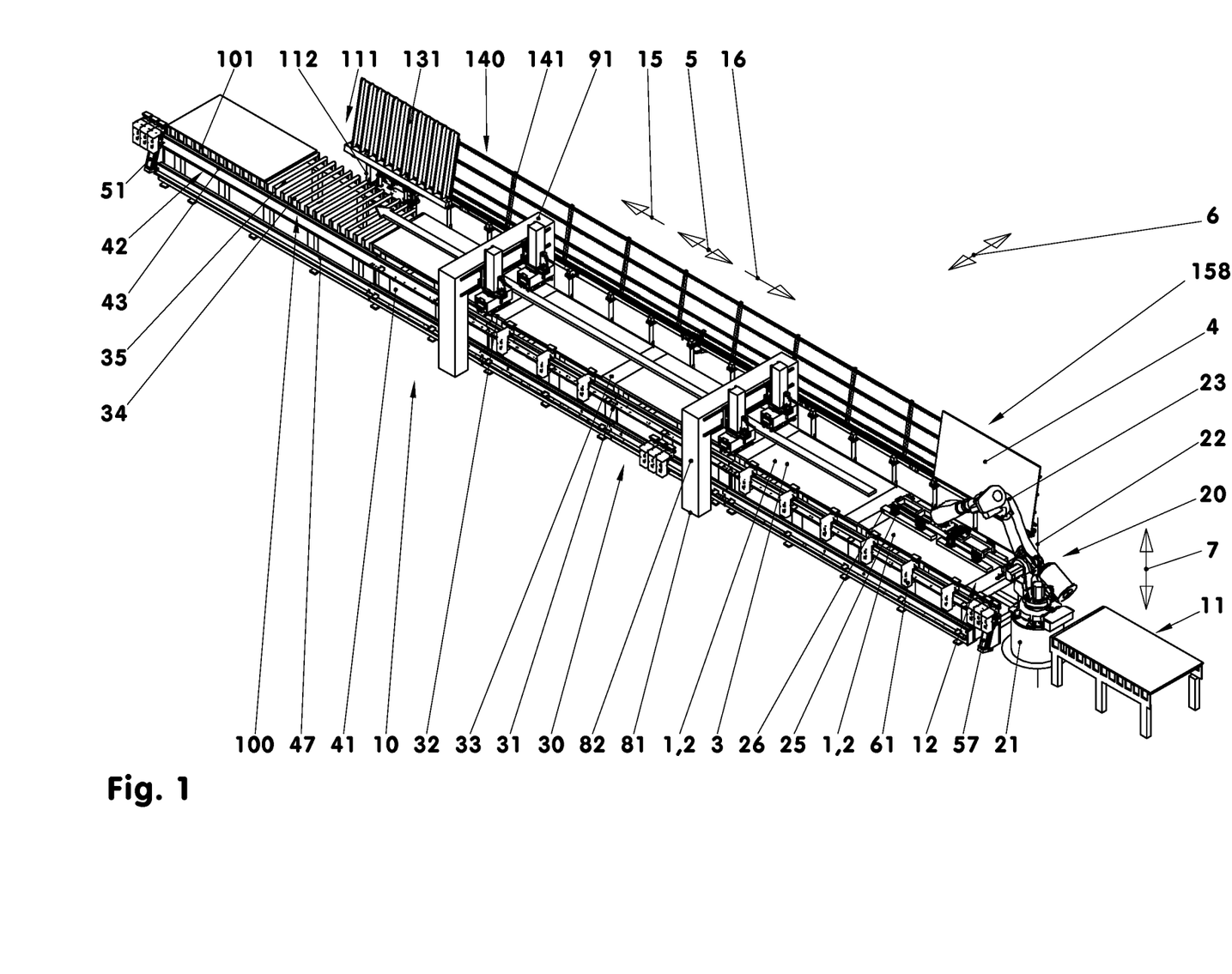
FIG. 1: Production cell.
Figure 2:
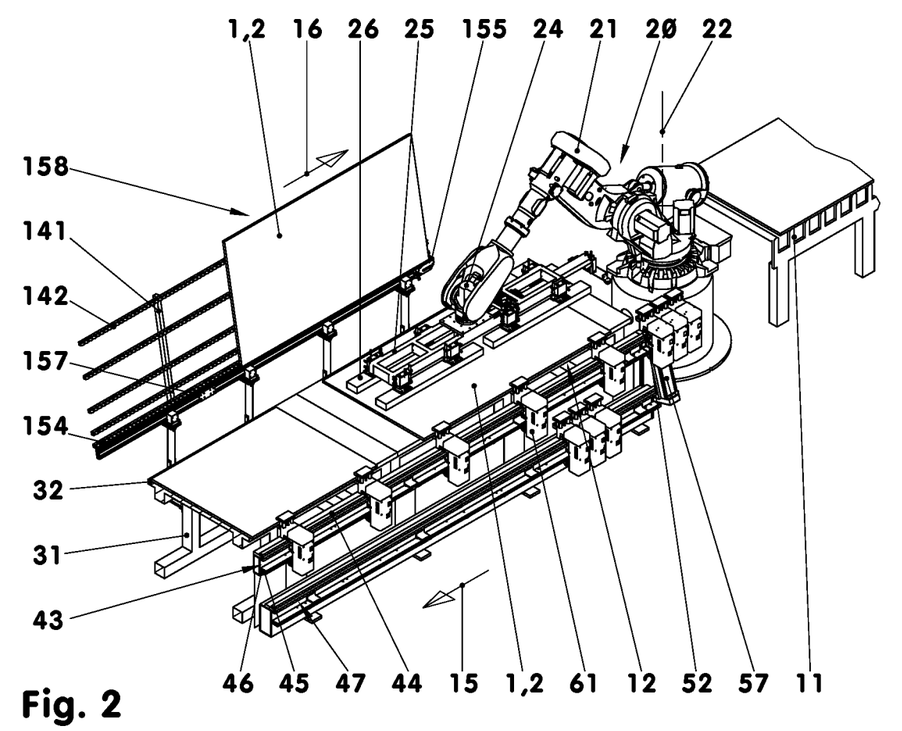
FIG. 2: Detail of the workpiece supply point.

In the production cell (10) shown, the workpiece (1; 2) to be processed is removed as a blank from the magazine (11) by means of a workpiece feeding device (20) and provided for processing, see FIGS. 1 and 2. The magazine (11) can have one or more workpiece stacks. In the exemplary embodiment, the workpiece feeding device (20) has a handling robot (21). This handling robot (21) can be pivoted, for example, about a vertically oriented axis (22). It has a gripper arm (23) that can be pivoted about at least two axes and a pivot head (24) that can be pivoted relative thereto. In the exemplary embodiment, the gripping device (25) arranged on the pivot head (24) has four suction bars (26) for gripping the workpiece (1; 2). Negative pressure is applied to these suction bars (26) to pick up a workpiece (1; 2). They pick up the workpiece (1; 2) at the workpiece upper side (3). To deposit the workpiece (1; 2), the pressure is again adjusted to the ambient pressure.

Manual or semi-manual workpiece feeding is also conceivable. Thereby, an operator picks up a workpiece (1; 2) to be processed from a stack and places it on the workpiece table (32) in the supply region (12). This can be done without or with the help of a hoist.

In this exemplary embodiment, the individual workpiece (1; 2) is designed to be plate-like. For example, it is a wooden panel for furniture making. For example, it has a length between one meter and three meters, a width between 0.5 meters and 1.5 meters and a thickness between 0.01 meters and 0.05 meters. However, the workpiece (1; 2) can also be made of a different material. This can be a composite material, aluminum, steel or any other material that can be processed by a cutting process.

The production cell (10) comprises a machine tool (30). This has a frame (31) with a machine table (32), a workpiece conveyor device (41) and, for example, two workpiece processing devices (81, 91). An embodiment with one or with more than two workpiece processing devices (81; 91) is also conceivable. In the exemplary embodiment, the frame (31) is a steel support structure standing on the hall floor. The flat machine table (32) is arranged on the frame (31). In the exemplary embodiment, the machine table (32) consists of a slideway (33) and a roller conveyor (34) adjoining it. The roller conveyor (34) can have driven rollers. If necessary, the entire machine table (32) can also be designed as a roller conveyor or as a brush conveyor. The length of the machine table (32) in the longitudinal direction (5) corresponds to the length of the frame (31).

A guide (42) of the workpiece conveyor device (41) is arranged on one longitudinal side of the frame (31). The guide (42) comprises two guide assemblies (43, 47) parallel to one another and offset from another in both the transverse direction (6) and the height direction (7). Each of the guide assemblies (43; 47) has a workpiece carriage guide rail (44) oriented in the longitudinal direction (5) and an electrical conductor rail assembly (45) parallel thereto. The respective workpiece carriage guide rail (44) has an overhead support profile. A toothed rack (46) is arranged on the frame (31) parallel to each workpiece carriage guide rail (44).

Workpiece carriage lifting devices (51; 57) are arranged at both ends of the guide (42). Each of these has a lifting carriage (52) that can be moved between the upper guide assembly (43) and the lower guide assembly (47). The lifting carriage (42) is moved, for example, by means of a lifting spindle driven by an electric motor. Thereby, it travels along a lifting ramp (53).

The single lifting carriage (52) has a guide rail section (54), a toothed rack section (56) and a section of the electrical conductor track assembly (55). In the exemplary embodiment, the length of the respective sections (54-56) is 2.5% of the length of the guide (42) in each case. The guide rail section (54), the toothed rack section (56), and the section of the electric conductor track (55) are each designed like the corresponding components of the guide assemblies (43, 47).

The workpiece conveyor device (41) further comprises a plurality of workpiece carriages (61). Such workpiece carriages (61) are, for example, identical in design to one another. Each of these workpiece carriages (61) can be moved along each of the guide assemblies (43; 47) and the workpiece carriage lifting devices (51; 57). Each individual workpiece carriage (61) is individually controllable. It can travel in the longitudinal direction (5) both in the conveying direction (15) and in the return direction (16) oriented opposite to the conveying direction (15).

Figure 7:
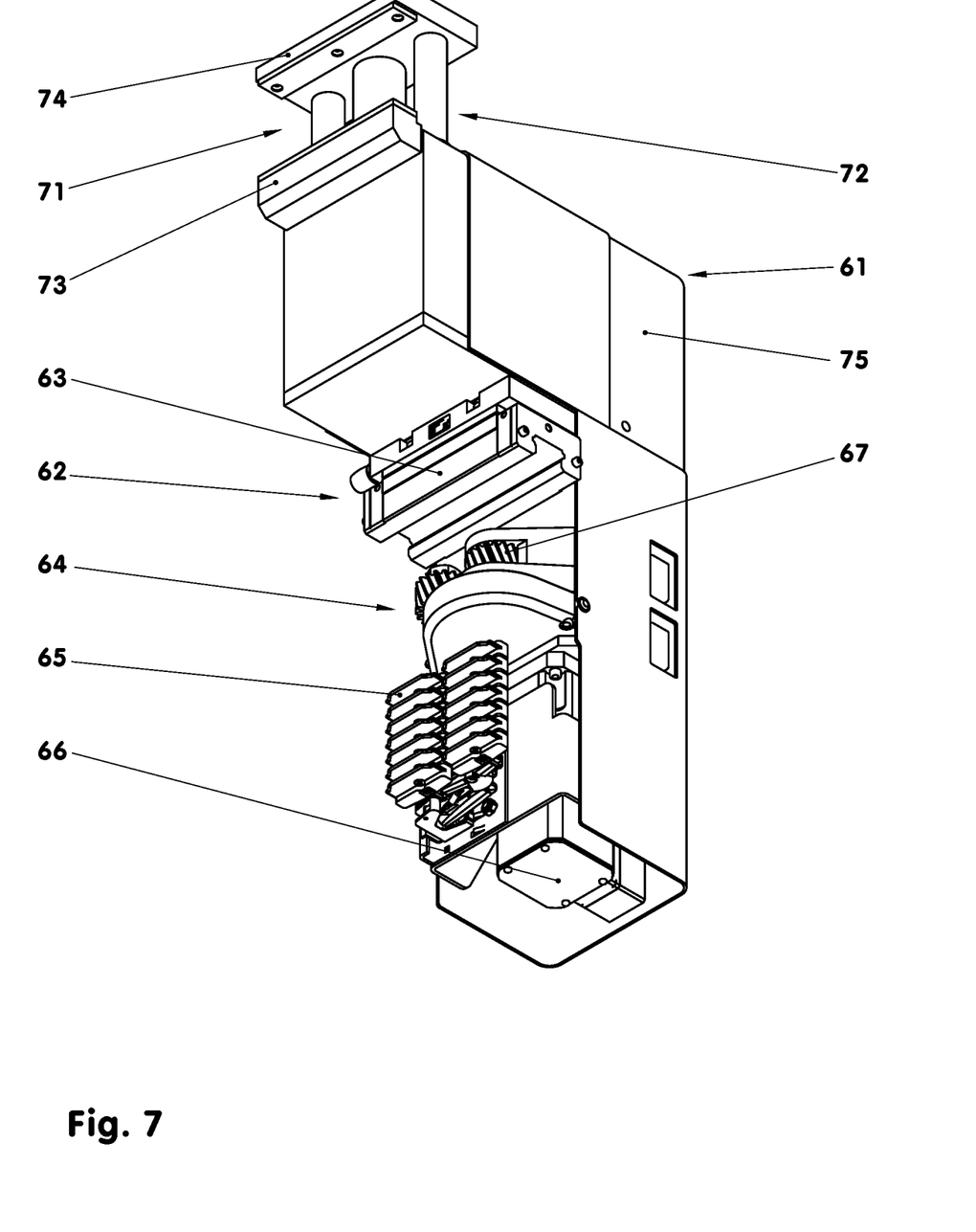
FIG. 7: Workpiece carriage.

The single workpiece carriage (61), see FIG. 7, has a guide unit (62), a drive unit (64) and a gripper unit (71). These aforementioned units (62, 64, 71) are arranged in a common housing (75). The guide unit (62) comprises a recirculating ball shoe (63) that engages around the workpiece carriage guide rail (44; 54) when the workpiece carriage (61) is mounted on the machine tool (30).

The drive unit (64) has a power and signal supply (65). In the case of workpiece carriages (61) used on the machine tool (30), this is in spring-loaded contact with the respective electrical conductor track assembly (45; 55) on the frame side. A drive motor (66) arranged in the workpiece carriage (61) drives a drive wheel (67). This drive gear (67) meshes with the toothed rack (46; 56) when the workpiece carriage (61) is inserted on the machine tool (30).

The gripping unit (71) is arranged above the guide unit (62). It comprises a parallel gripping device (72) with two clamping jaws (73, 74) movable relative to one another. In the exemplary embodiment, both clamping jaws (73, 74) can be moved relative to the housing (75) of the workpiece carriage (61). The opening and closing direction of the parallel gripping device (72) is oriented in the height direction (7). A height adjustment of the entire gripping unit (71) relative to the guide unit (62) is also conceivable. Both clamping jaws (73, 74) can also be adjusted in height in an individually driven manner. The gripping unit (71) can also be asymmetrical. For example, the lower clamping jaw (73) can have a shorter stroke than the upper clamping jaw (74).

The two tool processing devices (81, 91) of the illustrated machine tool (30) are workpiece processing devices (81, 91) arranged one behind the other in the longitudinal direction (5). In the exemplary embodiment, each of the workpiece processing devices (81; 91) has a gantry (82) standing on the shop floor. The single gantry (82) has a U-shaped gantry beam (83) oriented in the transverse direction (6), see FIG. 3. The respective gantry beam (83) has an overhead central beam (84) which supports, for example, two tool units (92, 93). For this purpose, the central beam (84) has support and guide rails (85) running in the transverse direction (6). Each of the tool units (92; 93) shown is mounted on such support and guide rails (85) by means of a cross slide (94). Thus, the individual tool unit (92; 93) can be moved in the transverse direction (6) and in the height direction (7) oriented normal to the conveying plane. It is also conceivable to move the individual tool unit (92; 93) relative to the central beam (84) in the longitudinal direction (5).

Figure 3:
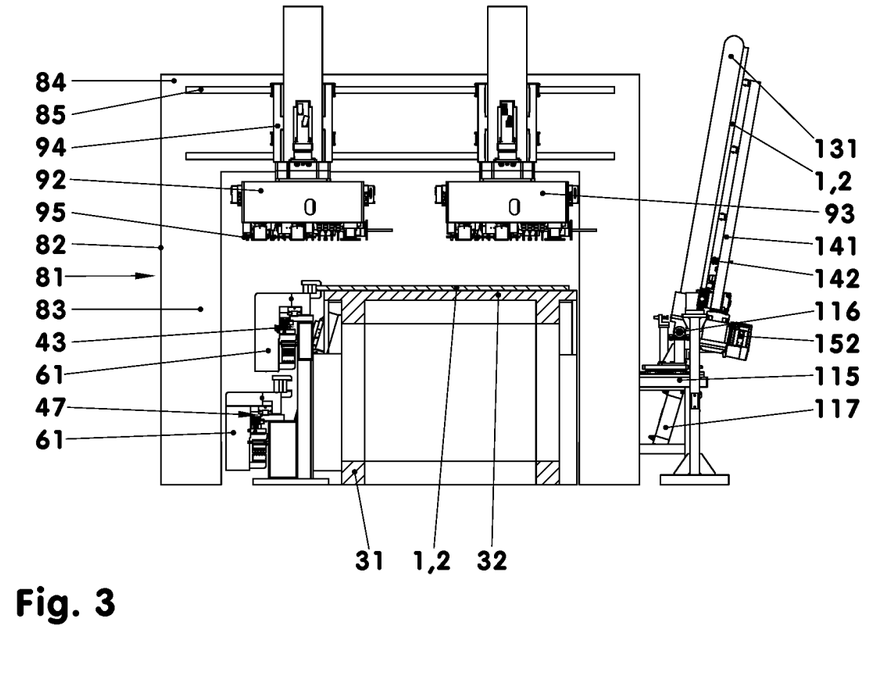
FIG. 3: Cross-section of the production cell.

Each of the tool units (92; 93) shown in the exemplary embodiment carries a plurality of tools (95). These are, for example, drilling, milling and sawing tools of various nominal dimensions. At least one tool changer is used for tool exchange. For a rotational and/or axially oriented tool drive, the tool unit has at least one tool drive motor.

Figures 4, 5, 6:
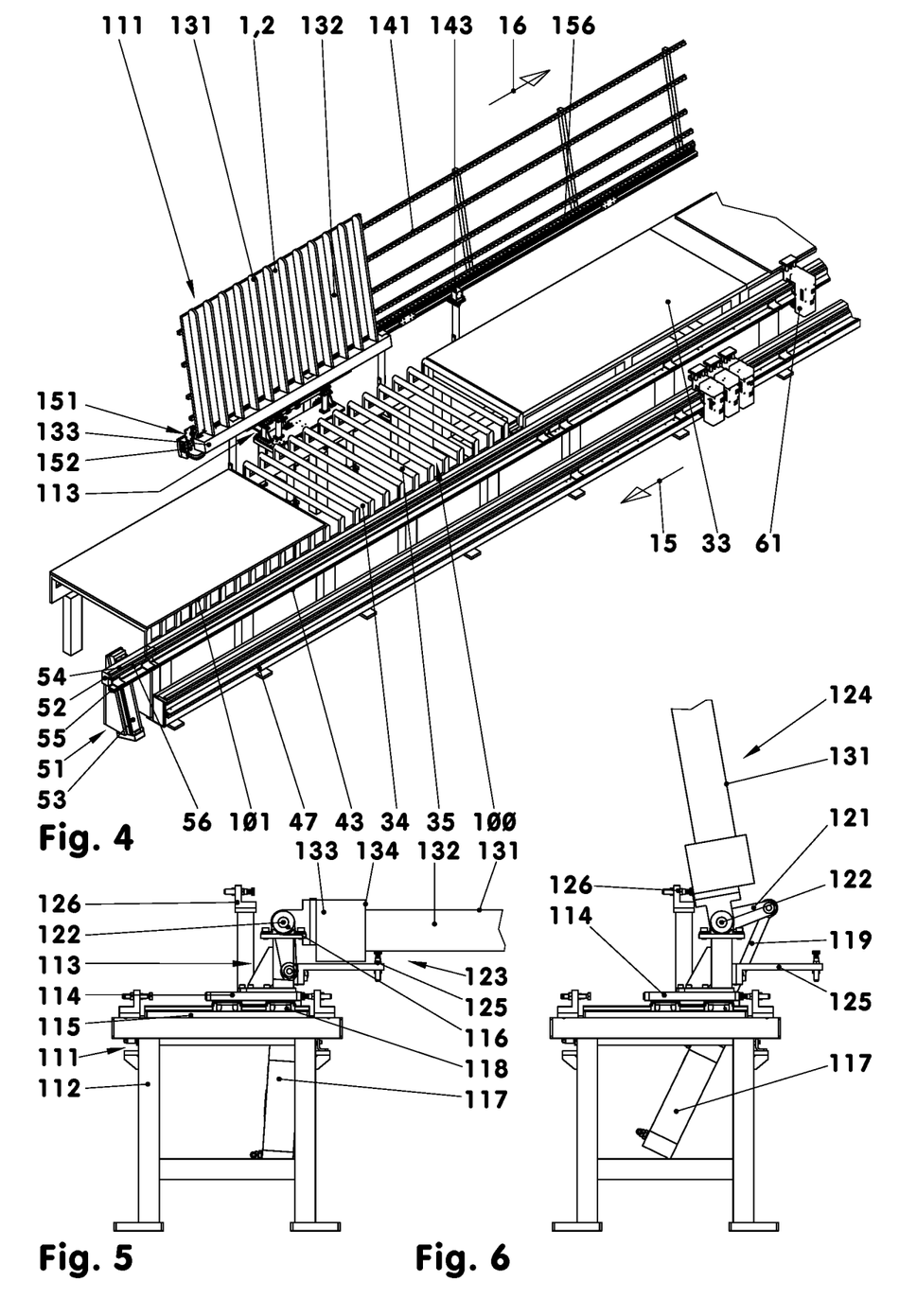
FIG. 4: Detail of the workpiece transfer station.
FIG. 5: Workpiece tilting device in an initial state.
FIG. 6: Workpiece tilting device in a tilted state.

The workpiece transfer station (100) in the illustrations of FIGS. 1 and 4 is located at the end of the machine tool (30) turned away from the workpiece feeding device (20). The workpiece transfer station (100) comprises a tool tilting device (111) and the pick-up station (101) downstream of it in the conveying direction (15). The workpiece tilting device (111) is arranged on the side of the machine tool (30) turned away from the workpiece conveyor device (41).

The workpiece tilting device (111) has a support frame (112) with a pivoting device (113) arranged next to the frame (31), see FIGS. 5 and 6. The support frame (112) can also be fastened to the frame (31) of the machine tool (30). A transverse slide (114) movable in the transverse direction (6) is mounted on the support frame (112). Such transverse slide (114) is driven by means of a positioning cylinder (115) that can be positioned continuously, for example. The transverse slide (114) carries a pivot bearing (116) and a pivot cylinder (117). The pivot cylinder (117) is pivotably mounted in a pivot pin (118) on the transverse slide (114). The pivot cylinder (117), which is hydraulically actuated, for example, has a piston rod (119) that is mounted on a pivot arm (121) of the pivot bearing (116). Another design of the pivot drive is also conceivable. For example, an electric motor can be used. The pivot axis (122) of the pivot bearing (116) is oriented in the longitudinal direction (5).

The pivot bearing (116) supports a pivot frame (131). This is constructed in a rake-like manner. It has tines (132) projecting normal to the pivot axis (122), which are connected in the region of the pivot bearing (116) by means of a tine carrier (133). The tine carrier (133) forms a stop bar (134) oriented in the longitudinal direction (5). In a horizontal end position (123) of the pivot frame (131), see FIG. 5, the tines (132) lie between the rollers (35) of the roller conveyor (34). In the pivoted end position (124) shown in FIGS. 1, 3, 4, and 6, the pivot frame (131) is pivoted, for example, by an angle of 110 degrees about the pivot axis (122).

The pivot frame (131) can have a transverse conveyor device. This is, for example, a conveyor belt arranged on a central tine (132). It is also conceivable, for example, to arrange driven conveyor rollers on one or more tines (132).

The axes of rotation of such conveyor rollers are then oriented in the longitudinal direction (5). It is also conceivable to arrange a workpiece pusher acting in the direction of the pivot axis (122) on the tines (132). Moreover, the pivot frame (131) can have a swing-down stop bar (134).

Two stop supports (125) fastened on the transverse slide (114) limit the pivot movement of the pivot frame (131) in the horizontal end position (123). Two further stops (126) limit the pivoted end position (124) of the pivot frame (131).

A workpiece return device (140) is arranged parallel to the frame (31). The workpiece return device (140) is connected to the workpiece transfer station (100) in terms of material flow. The workpiece return device (140) has a support frame (141) and at least two belt conveyors (151; 157) arranged in series. In the exemplary embodiment, the support frame (141) is inclined at an angle of 10 degrees to the vertical, see FIGS. 8 and 9. It has a plurality of support rollers (142) whose axes of rotation are inclined at the specified angle to the vertical. Proximity switches (143) are further arranged in the support frame (141), which are damped, for example, when the workpiece return device (140) is loaded.

Figures 8, 9:
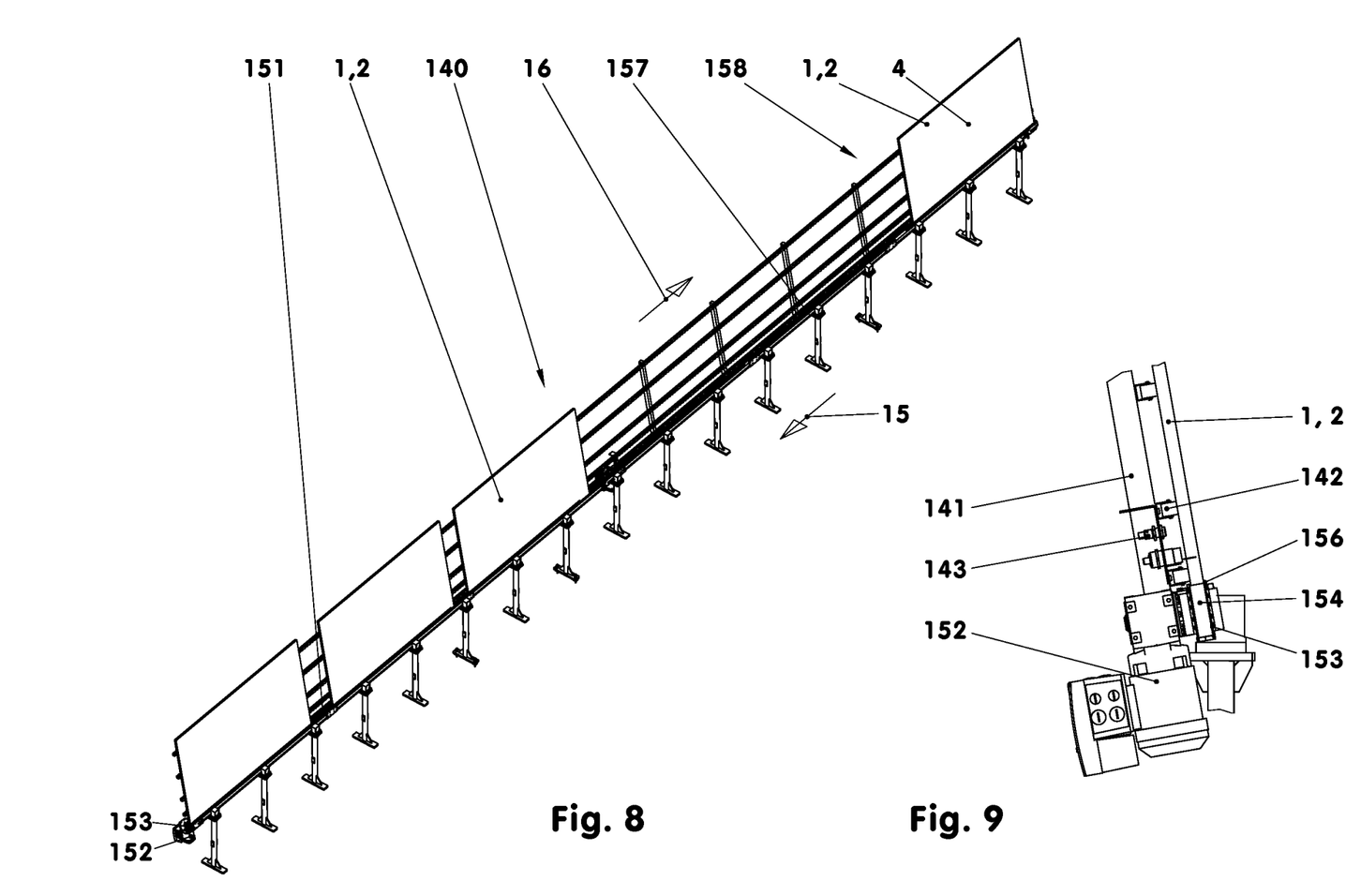
FIG. 8: Workpiece return device.
FIG. 9: Detail of the workpiece return device.

The single belt conveyor (151; 157) has a drive motor (152) that drives a drive drum (153). This is, for example, a toothed belt pulley (153). A conveyor belt (154) in the form of a toothed belt (154) wraps around the drive drum (153) and a tensioning drum (155). In addition, support and/or tension rollers can be arranged. In the exemplary embodiment, the single belt conveyor (151; 157) has a path and/or angle measuring system. This allows, for example, the workpiece-dependent positioning of the toothed belt (154). The single belt conveyor (151; 157) can thus be used for discontinuous conveying. Guide bars (156) are arranged on both sides of the individual belt conveyor (151; 157) in the exemplary embodiment. These overhang the upper run by 5 millimeters, for example.

The conveyor belt (154) can also be guided in a trough shape. Thereby, the trough is designed as a longitudinal channel oriented in the longitudinal direction (5). In the region of the drive drum (153), the upper run of the conveyor belt (154) is guided as a depression. Troughing takes place in the upper run shortly before reaching the tensioning drum (155). The inside of this conveyor belt (154) can have interrupted toothing in the transverse direction. For example, the region of the strongest trough is designed without toothing. It is also conceivable to form a belt conveyor (151; 157) with two conveyor belts (154) arranged in a V-shape.

When the individual workpiece (1; 2) is provided, it is placed against one or more workpiece carriages (61) in such a manner that it lies above the lower clamping jaws (73). The parallel gripping device (72) is closed. The position of the workpiece (1; 2) in the longitudinal direction (5) can be determined or checked, for example by means of a testing device. This results in the position of the workpiece (1; 2) relative to the workpiece carriages (61).

The workpiece carriage(s) (61) move(s) the workpiece (1; 2) in the conveying direction (15) oriented in the longitudinal direction (5), for example to the first workpiece processing device (81). Here, for example, workpiece-specific milling and drilling operations are carried out. During processing, the workpiece (1; 2) can be moved in the longitudinal directions (5) by means of the workpiece carriages (61). The individual tool unit (92; 93) can be moved in the transverse direction (6) and in the height direction (7) relative to the workpiece (1; 2). For example, during a drilling operation, the penetration depth of the tool into the workpiece (1; 2) is limited to 60% of the workpiece thickness. It is also conceivable to use a counterholder or a lost plate for a drilling operation under the workpiece.

Once the first workpiece (1; 2) is in the working region of the first workpiece processing device (81), a next workpiece (2; 1) can be provided. This second workpiece (2; 1) is picked up and conveyed by further workpiece carriages (61). The second workpiece (2; 1) can have different dimensions than the first workpiece (1; 2). The foreseen workpiece-specific processing operations may also differ from those of the first workpiece (1; 2).

After completion of processing operation at the first processing station, i.e. at the first workpiece processing device (81), the workpiece (1; 2) is conveyed by means of the workpiece carriages (61) in the conveying direction (15) to the second processing device (91). The processing operation on the second processing device (91) is performed in the same manner as processing on the first processing device (81). The production cell (10) can also be equipped with one or more than two workpiece processing devices (81; 91). Instead of the gantries (82) shown, the tool units (92; 93) can also be arranged on industrial robots.

As soon as the first workpiece (1; 2) has left the working space of the first workpiece processing device (81), the second workpiece (2; 1) is conveyed into the working space of the first workpiece processing device (81).

After completion of the processing operation at the second workpiece processing device (91), the workpiece (1; 2) is conveyed to the workpiece transfer station (100). If the workpiece (1; 2) has already been completely processed, it is deposited at the pick-up station (101). To deposit the workpiece, the parallel gripping devices (72) of the workpiece carriages (61) open. The empty workpiece carriages (61) now move further in the conveying direction (15) into the guide rail section (54) of the workpiece carriage lifting device (51). The workpiece (1; 2) can be removed from the production cell (10), for example, by means of a handling device. This handling device can be, for example, a handling robot. Manual removal or removal by means of a hoist is also conceivable. The workpiece (1; 2) can, for example, be further processed at an additional processing station, for example at another production cell (10).

If further processing operations are planned on the workpiece (1; 2) in the production cell (10), the workpiece (1; 2) is deposited in the region of the workpiece tilting device (111). The empty workpiece carriages (61) move to the workpiece carriage lifting device (51) as described above.

For example, as soon as three workpiece carriages (61) are on the guide rail section (54) of the workpiece carriage lifting device (51), the lifting carriage (52) is lowered. After lowering, the guide rail section (52) is aligned with the workpiece carriage guide rail (44) of the lower guide assembly (47). Now the workpiece carriages (61) may move along the lower guide rail (44) to the workpiece supply point (12). Here, the workpiece carriages (61) are lifted back up to the level of the workpiece carriage guide rail (44) of the upper guide assembly (43) by means of the second workpiece carriage lifting device (57). The returned workpiece carriages (61) can now be used to transport further workpieces (1; 2).

If the workpiece (1; 2) has been placed on the workpiece tilting device (111), such workpiece (1; 2) is returned. The workpiece tilting device (111) is initially in the horizontal end position (123) shown in FIG. 5. The workpiece tilting device (111) is moved, for example, by means of the positioning cylinder (115) in the direction of the transverse direction (6) turned away from the workpiece carriages (61). When the pivot cylinder (117) is actuated, the pivot frame (131) with the workpiece (1; 2) lying on it is tilted into the pivoted end position (124) shown in FIG. 6. The workpiece (1; 2) slides along the pivot frame (131) in the direction of the workpiece return device (140). This can be performed under gravity control. If necessary, the movement of the workpiece (1; 2) can also be controlled by means of the mentioned transverse conveyor device.

The tilted workpiece (1; 2) is placed on the conveyor belt (154). The workpiece (1; 2) now points with its unprocessed workpiece lower side (4) in the direction of the workpiece carriage (61). The pivoting device (131) continues the tilting movement until the workpiece (1; 2) rests against the support rollers (142) of the support frame (141). For example, the maximum pivot angle of the workpiece tilting device (111) is achieved. The workpiece (1; 2) is now taken over by the workpiece return device (140). The workpiece tilting device (111) can now be pivoted back to its, for example, level starting position.

The workpiece return device (140) then conveys the first workpiece (1; 2) by at least the amount of the length of the subsequent workpiece (2; 1) in the return conveying direction (16) by means of the first belt conveyor (151). For example, as soon as the next workpiece (2; 1) is placed on the first belt conveyor (151), the first belt conveyor (151) conveys the first two workpieces (1, 2) by at least the amount of the length of the subsequent workpiece in the return direction (16).

As soon as the first workpiece (1; 2) reaches the second belt conveyor (157), the latter takes over the first workpiece (1; 2) and conveys it to the end of the conveyor section located next to the workpiece supply point (12). As soon as the workpiece (1; 2) reaches such position, the second belt conveyor (157) stops. The transfer of a workpiece (1; 2) between the first belt conveyor (151) and the second belt conveyor (157) can already take place when the second belt conveyor (157) is not carrying a workpiece (1; 2).

In the exemplary embodiment, the region of the second belt conveyor (157) adjacent to the supply region (12) forms a workpiece temporary storage device (158). The handling robot (21) can remove the workpiece (1; 2) from this workpiece temporary storage device (158). The handling robot (21) grips the workpiece (1; 2) on its lower side (4) and places it in the supply region (12) on the machine table (32) with the upper side (3) facing downward. The processed workpiece (1; 2) can also be removed from the workpiece temporary storage device (158) by the operator by hand or by means of a lifting tool and deposited in the supply region (12).

It is also conceivable to remove the processed workpiece (1, 2) from the production cell (10) at the workpiece temporary storage device (158). This can be done by means of the handling robot (21), by hand or with the aid of a hoist.

The workpiece temporary storage device (158) can also be designed differently than shown. For example, the workpiece (1; 2) provided for supply can be lifted off or discharged from the second belt conveyor (157). With such an embodiment, more than one workpiece (1; 2) can be temporarily stored in the workpiece temporary storage device (158).

The workpiece (1; 2) provided is picked up by the workpiece carriages (61) and conveyed in the conveying direction (15) in the direction of the workpiece processing devices (81, 91). Here, the lower side (4) of the workpiece (1; 2) is processed. For example, through-holes of the workpiece (1; 2) are also completed here.

After processing is completed, the workpiece (1; 2) is deposited, for example, at the pick-up station (101) of the workpiece transfer station (100).

Figure 10:
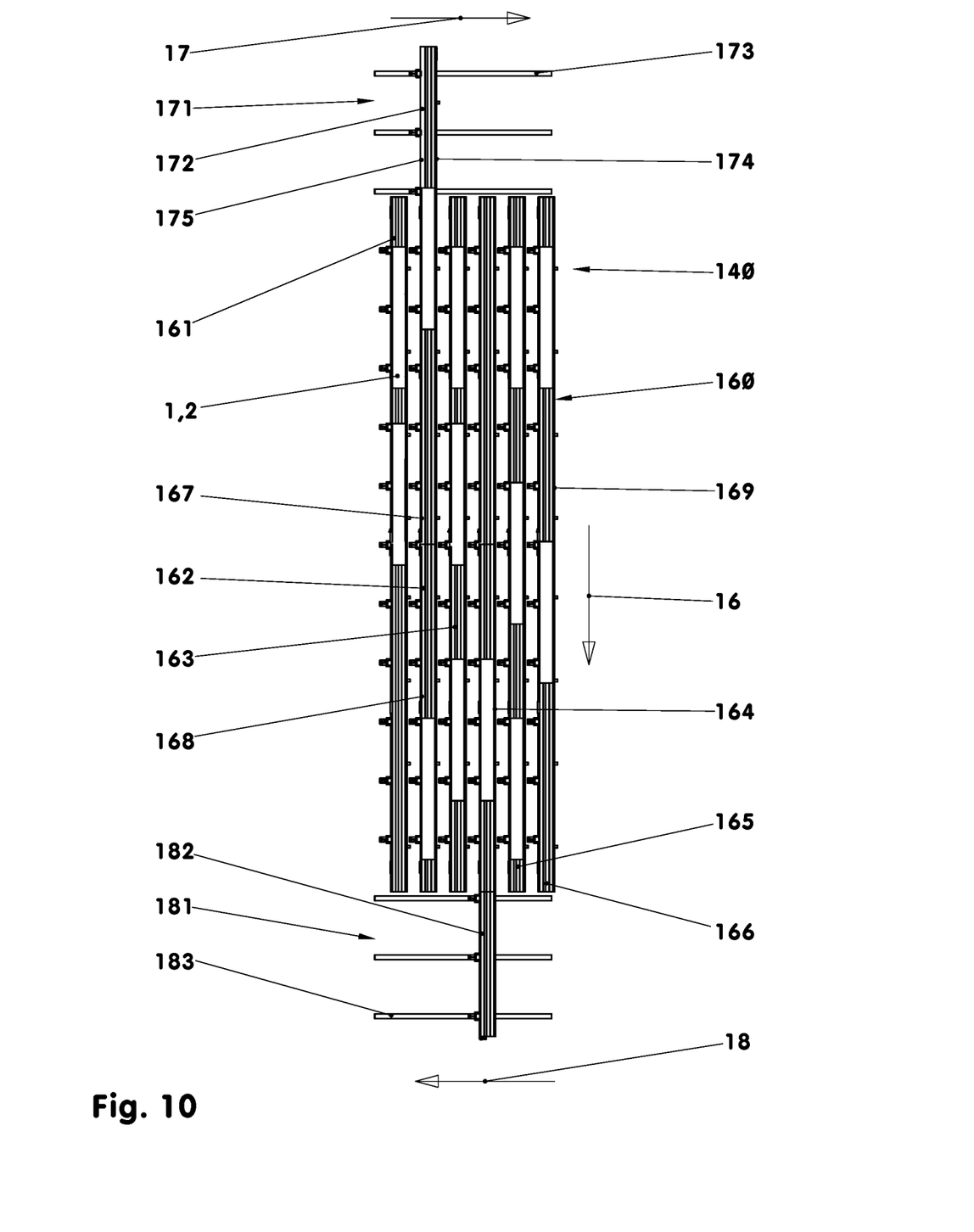
FIG. 10: Variant of the workpiece return device.

FIG. 10 shows a variant of a workpiece return device (140). This workpiece return device (140) is designed with multiple tracks in some regions. In the exemplary embodiment, it has six tracks (161-166) parallel to one another. For workpieces (1; 2) that are conveyed at the workpiece transfer station (100) in the direction of the workpiece return device (140), this workpiece return device (140) is connected downstream of the workpiece transfer station (100) in the flow of material.

The workpiece return device (140) has a transfer device (171) on the input side. This has a transfer pusher (172) that can be moved along transfer rails (173) in a transfer direction (17) oriented in the transverse direction (6). The transfer pusher (172) has a support frame (174) and a belt conveyor (175), for example, configured as the units described in connection with the first exemplary embodiment. A transfer drive is used to move the transfer pusher (172) along a transfer rail (173). Such transfer drive is locked against a conveyor drive of the belt conveyor (175). Thus, the belt conveyor can only be put into operation if the transfer drive is at a standstill and vice versa.

The individual tracks (161-166) are identical to one another in the exemplary embodiment. Each of the tracks (161-166) has, for example, two belt conveyors (167, 168) arranged one behind the other in the return direction (16) and a continuous or multi-part support frame (169). Such assemblies are constructed, for example, as described in connection with the first exemplary embodiment. Where appropriate, the single track (161-166) can have only one or more than two belt conveyors (167; 168).

The tracks (161-166) end in the return direction (16) at a return transfer device (181). Such return transfer device (181) on the output side is, for example, a mirror image of the transfer device (171) on the input side. The individual workpiece (1; 2) can be conveyed in a return transfer direction (18) by means of a return transfer pusher (182) that can be moved along return transfer rails (183).

During operation of the workpiece return device (140) shown in FIG. 10, the workpiece (1; 2) is transferred from the tilting device (111) to the transfer pusher (172) at the workpiece transfer station (100). The transfer pusher (172) is in the position closest to the workpiece transfer station (100). After picking up the workpiece (1; 2), the transfer pusher (172) moves along the transfer rails (173) until its belt conveyor (175) is flush with the first belt conveyor (167) of one of the tracks (161-166). In this position of the transfer pusher (172), the support frame (174) of the transfer pusher (172) is aligned with the support frame (169) of the track (161-166). When the transfer pusher (172) is at a standstill, the belt conveyor (175) conveys the workpiece (1; 2) into the second track (162) as shown in FIG. 10. The multi-track region of the workpiece return device (140) forms a workpiece buffer (160).

To remove a workpiece (1; 2) from the workpiece buffer (160), the return transfer pusher (182) moves to the corresponding track (161-166). In the illustration of FIG. 10, the return transfer pusher (182) is in the extension of the fourth track (164). The, for example, second belt conveyor (168) of the fourth track (164) conveys the workpiece (1; 2) onto the return transfer pusher (182). This return transfer pusher (182) is part of the workpiece temporary storage device (158). After the workpiece (1; 2) has been taken over, the return transfer pusher (182) moves in the return transfer direction (18) in the direction of the workpiece supply point (12). Further processing and/or removal of the workpiece (1; 2) is carried out as described above.

Combinations of the individual exemplary embodiments are also conceivable.

LIST OF REFERENCE SIGNS

1 Workpiece, first workpiece
2 Workpiece, second workpiece
3 Workpiece upper side
4 Workpiece lower side
5 Longitudinal direction
6 Transverse direction
7 Height direction
10 Production cell
11 Magazine
12 Workpiece supply point, supply region
15 Conveying direction
16 Return direction
17 Transfer direction
18 Return transfer direction
20 Workpiece feeding device
21 Handling robot
22 Vertically oriented axis
23 Gripper arm
24 Pivot head
25 Gripping device
26 Suction bar
30 Machine tool
31 Frame
32 Workpiece table, machine table
33 Slideway
34 Roller conveyor
34 Rollers
41 Workpiece conveyor device
42 Guide
43 Guide assembly, upper guide assembly
44 Workpiece carriage guide rail
45 Electrical conductor track assembly
46 Toothed rack
47 Guide assembly, lower guide assembly
51 Workpiece carriage lifting device
52 Lifting carriage
53 Lifting ramp
54 Guide rail section
55 Section of the electrical conductor track assembly
56 Toothed rack section
57 Workpiece carriage lifting device
61 Workpiece carriage
62 Guide unit
63 Recirculating ball bearing unit
64 Drive unit
65 Power and signal supply
66 Drive motor
67 Drive wheel
71 Gripping unit
72 Parallel gripping device
73 Clamping jaw, bottom
74 Clamping jaw, top
75 Housing
81 Workpiece processing device
82 Gantry
83 Gantry carrier
84 Central beam
85 Support and guide rails
91 Workpiece processing device
92 Tool unit
93 Tool unit
94 Cross slide
95 Tool
100 Workpiece transfer station
101 Pick-up station
111 Workpiece tilting device
112 Support frame
113 Pivot device
114 Transverse slide
115 Positioning cylinder
116 Pivot bearing
117 Pivot cylinder
118 Trunnion
119 Piston rod
121 Pivot arm
122 Pivot axis
123 End position, horizontal
124 End position, pivoted
125 Stop supports
126 Stops
131 Pivot frame, tilt frame
132 Tines
133 Tine carrier
134 Stop bar
140 Workpiece return device
141 Support frame
142 Support rollers
143 Proximity switches
151 Belt conveyor, first belt conveyor
152 Drive motor
153 Drive drum, toothed belt pulley
154 Conveyor belt, toothed belt
155 Tensioning drum
156 Guide bars
157 Belt conveyor, second belt conveyor
158 Workpiece temporary storage device
160 Workpiece buffer
161 First track of (140)
162 Second track of (140)
163 Third track of (140)
164 Fourth track of (140)
165 Fifth track of (140)
166 Sixth track of (140)
167 Belt conveyor
168 Belt conveyor
169 Support frame
171 Transfer device
172 Transfer pusher
173 Transfer rails
174 Support frame
175 Belt conveyor
181 Return transfer device
182 Return transfer pusher
183 Return transfer rails

The invention claimed is:
1. A production cell (10), comprising:
a workpiece conveyor device (41) comprising a plurality of workpiece carriages (61);
a workpiece processing device (81; 91);
a workpiece transfer station (100);
a workpiece tilting device (111) for tilting a workpiece from a horizontal orientation into a vertically inclined orientation arranged at the workpiece transfer station (100); and
a workpiece return device (140) with a workpiece temporary storage device (158), wherein the workpiece carriages (61) are configured to convey the workpiece (1; 2) to the workpiece processing device (81; 91) and from the workpiece processing device (81; 91) to the workpiece transfer station (100), wherein the workpiece tilting device (111) is configured to transfer the workpiece (1; 2) to the workpiece return device (140) at the workpiece transfer station (100), wherein the workpiece return device (140) is configured to convey the workpiece (1; 2) into the workpiece temporary storage device (158) while in the vertically inclined orientation, and wherein the workpiece (1; 2) can be removed from the workpiece temporary storage device (158) and can be provided to the workpiece conveyor device (41) in an upside-down horizontal orientation.

2. The production cell (10) according to claim 1, further comprising a workpiece feeding device (20), wherein the workpiece feeding device (20) is configured to remove the workpiece (1; 2) from the workpiece temporary storage device (158) and to provide the workpiece (1; 2) to the workpiece conveyor device (41).

3. The production cell (10) according to claim 2, wherein the workpiece feeding device (20) comprises a handling robot (21).

4. The production cell (10) according to claim 1, wherein each of the workpiece carriages (61) is rail-bound and configured to be individually controlled.

5. The production cell (10) according to claim 1, wherein the workpiece conveyor device (41) comprises an upper guide assembly (43) and a lower guide assembly (47).

6. The production cell (10) according to claim 5, further comprising a workpiece carriage lifting device (51; 57) configured to move an individual one of the workpiece carriages (61) between the upper guide assembly (43) and the lower guide assembly (47).

7. The production cell (10) according to claim 1, wherein the workpiece tilting device (111) comprises a pivot frame (131) having a pivot angle greater than 90 degrees and less than 150 degrees for tilting the workpiece from the horizontal orientation into the vertically inclined orientation.

8. The production cell (10) according to claim 1, wherein the workpiece return device (140) comprises at least two discontinuously conveying belt conveyors (151, 157; 175, 167; 167, 168).

9. The production cell (10) according to claim 1, wherein the workpiece return device (140) comprises, at least in some regions, multiple tracks.

10. The production cell (10) according to claim 1, wherein the workpiece conveyor device (41) comprises a workpiece carriage guide rail (44) along which the workpiece carriages (61) can move.

11. A method for processing a workpiece (1; 2) in a production cell (10), comprising:

providing the workpiece (1; 2) to a workpiece conveyor device (41), the workpiece conveyor device (41) comprising a plurality of workpiece carriages (61);

conveying the workpiece (1; 2), by the workpiece conveyor device (41), to a workpiece processing device (81; 91);

processing, by workpiece processing device (81; 91), an upper side of the workpiece (1; 2);

conveying the workpiece (1; 2), by the workpiece conveyor device (41), from the workpiece processing device (81; 91) to a workpiece transfer station (100);

transferring the workpiece (1; 2), by a workpiece tilting device (111) arranged at the workpiece transfer station (100), from a horizontal orientation on the workpiece conveyor device (41) into a vertically inclined orientation to a workpiece return device (140);

conveying the workpiece (1; 2), by the workpiece return device (140), into a workpiece temporary storage device (158) while in the vertically inclined orientation;

removing the workpiece (1; 2) from the workpiece temporary storage device (158);

providing the workpiece to the workpiece conveyor device (41) in an upside-down orientation for processing the workpiece a second time;

conveying, by the workpiece conveyor device (41), the workpiece (1; 2) to the workpiece processing device (81; 91); and processing, by the workpiece processing device (81; 91), a lower side of the workpiece (1; 2).

12. The method according to claim 11, wherein conveying the workpiece (1; 2) includes moving at least one of the workpiece carriages (61) along a workpiece carriage guide rail (44).

\* \* \* \* \*